(12) United States Patent
Miyoshi et al.

(10) Patent No.: US 8,422,578 B2
(45) Date of Patent: Apr. 16, 2013

(54) RADIO TRANSMISSION APPARATUS, RADIO COMMUNICATION BASE STATION APPARATUS, RADIO COMMUNICATION MOBILE STATION APPARATUS, AND TRANSMISSION SIGNAL GENERATING METHOD

(75) Inventors: Kenichi Miyoshi, Osaka (JP); Hidetoshi Suzuki, Kanagawa (JP); Akihiko Nishio, Osaka (JP); Daichi Imamura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/282,207

(22) Filed: Oct. 26, 2011

(65) Prior Publication Data

US 2012/0057649 A1 Mar. 8, 2012

Related U.S. Application Data

(63) Continuation of application No. 12/159,376, filed as application No. PCT/JP2006/325792 on Dec. 25, 2006, now Pat. No. 8,073,065.

(30) Foreign Application Priority Data

Dec. 27, 2005 (JP) ................. 2005-375402

(51) Int. Cl.
*H04K 1/10* (2006.01)
(52) U.S. Cl.
USPC ........... 375/260; 375/259; 375/262; 375/295; 375/316; 375/342
(58) Field of Classification Search .................. 375/135, 375/146, 259, 260, 267, 295, 299, 322, 261, 375/271, 316, 343
See application file for complete search history.

(56) References Cited

U.S. PATENT DOCUMENTS 7,508,876 B2 3/2009 Tzannes
7,782,896 B2 * 8/2010 Kuri et al. ...................... 370/465
(Continued)

FOREIGN PATENT DOCUMENTS

| CN | 1395387 | 2/2003 |
|---|---|---|
| JP | 2003-218759 | 7/2003 |
| JP | 2003-258757 | 9/2003 |

OTHER PUBLICATIONS

Panasonic; Coordinated symbol repetition to mitigate downlink inter cell interference, Aug. 2005.*

(Continued)

*Primary Examiner* — Hirdepal Singh
(74) *Attorney, Agent, or Firm* — Dickinson Wright PLLC

(57) ABSTRACT

A base station allowing mobile stations to efficiently remove interference signals. In this base station, an encoding part performs an error correction encoding of transport data to generate a bit sequence comprising systematic bits and parity bits; a repetition part repeats, as a repetition subject, only the parity bits out of the plurality of bits included in the bit sequence, which is generated by the encoding part, so as to perform a rate matching; a modulating part modulates, after the repetition, the bit sequence to generate symbols; an S/P part parallel converts the symbols serially inputted from the modulating part (103) and then outputs them to an IFFT part; and the IFFT part performs an IFFT processing of the symbols inputted from the S/P part and then maps them onto subcarriers in accordance with a predetermined mapping pattern, thereby generating OFDM symbols.

4 Claims, 10 Drawing Sheets

U.S. PATENT DOCUMENTS

| | | | |
|---|---|---|---|
| 7,856,064 B2 * | 12/2010 | Miyoshi et al. | 375/260 |
| 7,983,357 B2 | 7/2011 | Kim | |
| 8,213,535 B2 * | 7/2012 | Yano et al. | 375/295 |
| 2003/0007476 A1 | 1/2003 | Kim | |
| 2004/0125882 A1 * | 7/2004 | Miyoshi | 375/260 |
| 2004/0146029 A1 | 7/2004 | Tong | |
| 2005/0100085 A1 | 5/2005 | Dottling | |
| 2005/0110286 A1 * | 5/2005 | Zhang | 293/154 |
| 2006/0023802 A1 * | 2/2006 | Balakrishnan et al. | 375/265 |
| 2008/0144729 A1 | 6/2008 | Miyoshi | |
| 2009/0083604 A1 | 3/2009 | Tong | |
| 2012/0147848 A1 * | 6/2012 | Popovic et al. | 370/330 |
| 2012/0204083 A1 * | 8/2012 | Miyazaki et al. | 714/801 |

OTHER PUBLICATIONS

International Search Report dated Mar. 20, 2007.

TSG RAN WG1 Meeting #42 R1-050829, Panasonic, "Coordinated Symbol Repetition to Mitigate Downlink Inter Cell Interference," Aug. 2005, 4 pages total, Internet <URL:http://www.3gpp.org/ftp/tsgran/WG1RL1/TSGR142/Docs/R1-050829.zip>.

TSG RAN WG1 Meeting #43 R1-051396, Panasonic, "Comparison of bit repetition and symbol repetition for inter-cell interference mitigation," Nov. 2005, 3 pages total, Internet<URL:http://www.3gpp.org/ftp/tsgran/WG1RL1/TSGR143/Docs/R1-051396.zip>.

* cited by examiner

RADIO TRANSMISSION APPARATUS, RADIO COMMUNICATION BASE STATION APPARATUS, RADIO COMMUNICATION MOBILE STATION APPARATUS, AND TRANSMISSION SIGNAL GENERATING METHOD

This is a continuation application of application Ser. No. 12/159,376 filed Jun. 26, 2008, which is a national stage of PCT/JP2006/325792 filed Dec. 25, 2006, which is based on Japanese Application No. 2005-375402 filed Dec. 27, 2005, the entire contents of each of which are incorporated by reference herein.

TECHNICAL FIELD

The present invention relates to a radio transmitting apparatus and multicarrier signal generating method.

BACKGROUND ART

In recent years, in radio communication, particularly in mobile communication, various kinds of information such as images and data as well as speech are subjected to transmission. From now on, it is expected that demands further increase for transmitting various types of content, and it naturally follows that the need for high-speed transmission is expected to further increase. However, when high-speed transmission is performed in mobile communication, the influence of delayed waves due to multipath is not negligible, and transmission performance degrades due to frequency selective fading.

Multicarrier communication such as OFDM (Orthogonal Frequency Division Multiplexing) is focused upon as one of counter techniques of frequency selective fading. Multicarrier communication is a technique of transmitting data using a plurality of carriers (subcarriers) with transmission speed suppressed to such an extent that frequency selective fading does not occur, which results in high-speed transmission. Particularly, the OFDM scheme utilizes a plurality of subcarriers which are orthogonal to each other and where data is arranged, provides high frequency efficiency in multicarrier communication, can be implemented with relatively simple hardware, is particularly focused upon and is variously studied.

Meanwhile, in mobile communication, an adaptive array antenna (hereinafter "AAA") technique is studied for adaptively controlling reception directivity by multiplying signals received by a plurality of antennas by weighting coefficients (weight). This AAA technique makes it possible to cancel interference signals from received signals by controlling the weight adaptively using MMSE (Minimum Mean Square Error).

Then, for example, Patent Document 1 discloses a technique for estimating an optimum weight promptly and precisely in a receiving apparatus where the OFDM scheme and AAA technique are combined.

Patent Document 1: Japanese Patent Application Laid-Open No. 2003-218759

DISCLOSURE OF INVENTION

Problems to be Solved by the Invention

The AAA technique can cancel interference signals equivalent to the number of antennas minus one in principle. In other words, when the number of interference signal sources is N, the receiving apparatus disclosed in Patent Document 1 requires N+1 antennas. Further, when signals transmitted from interference signal sources are received in the receiving apparatus in a multipath environment, where M is the number of multipath for interference signal sources, the receiving apparatus disclosed in Patent Document 1 requires a large number (N×M+1) of antennas.

Thus, the receiving apparatus disclosed in Patent Document 1 requires a large number of antennas for canceling interference signals, it naturally follows that it is actually difficult to mount the receiving apparatus disclosed in Patent Document 1 in a radio communication mobile station apparatus (hereinafter "mobile station") for which miniaturization is increasingly demanded in recent years.

It is therefore an object of the present invention to provide a radio transmitting apparatus and multicarrier signal generating method that cancel interference signals efficiently in a radio receiving apparatus.

Means for Solving the Problem

The radio transmitting apparatus of the present invention that transmits a multicarrier signal comprised of a plurality of subcarriers, employs a configuration having: a encoding section that encodes a transmission bit and generates a first bit sequence; a repetition section that repeats a bit of a repetition target in a plurality of bits included in the first bit sequence and generates a second bit sequence comprising a first bit of a repetition source and a second bit generated by repetition; a modulation section that modulates the second bit and generates a plurality of same symbols as symbols that can be generated only from the first bit, from the first bit and the second bit; and a generating section that generates the multicarrier signal by mapping the plurality of same symbols on the plurality of subcarriers according to a same mapping pattern as a mapping pattern of other radio transmitting apparatuses.

Advantageous Effect of the Invention

The present invention is able to cancel interference signals efficiently in a radio receiving apparatus.

BEST MODE FOR CARRYING OUT THE INVENTION

The operation principle of the present invention will be described. Further, although, in the following explanation, an OFDM scheme will be described as an example of a multicarrier communication scheme, the present invention is not limited to the OFDM scheme.

Figure 1:
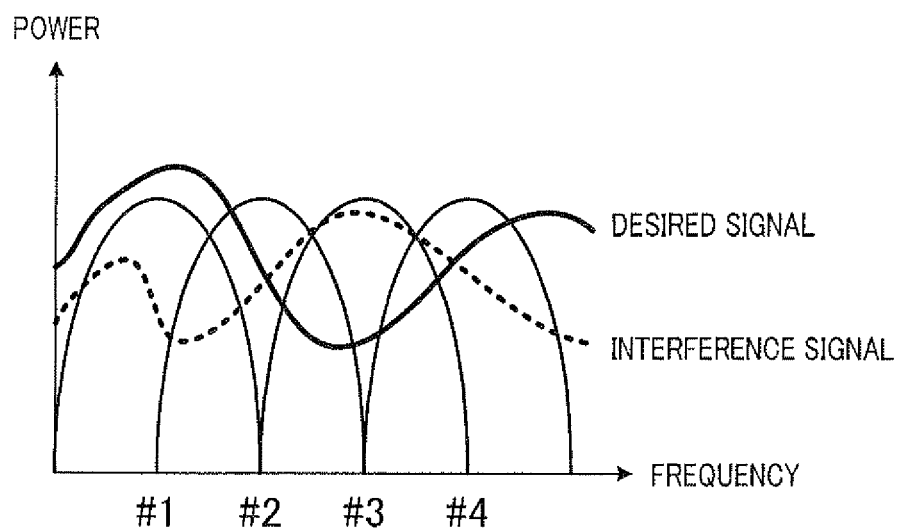
FIG. 1 is a concept diagram showing an OFDM signal.

An OFDM symbol, which is a multicarrier signal, has an extremely low symbol rate, and, consequently, an OFDM symbol received in a multipath environment is received as a signal where signals of a plurality of paths are combined regardless of the number of multipaths. Accordingly, when, in the OFDM scheme, a desired signal and an interference signal are received in a mobile station through multipath, the mobile station receives, as shown in FIG. 1, both the desired signal and the interference signal as the signals where signals of a plurality of paths are combined.

Figure 2A:
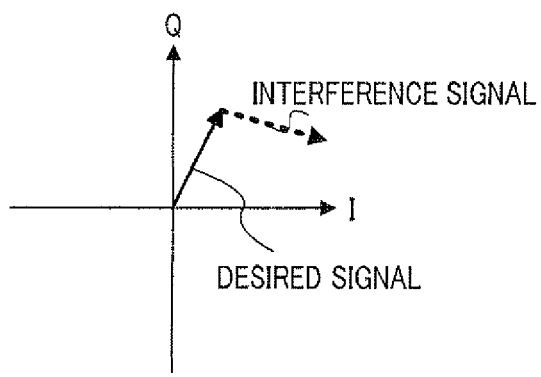
FIG. 2A is a concept diagram showing a symbol of subcarrier #1.
Figure 2B:
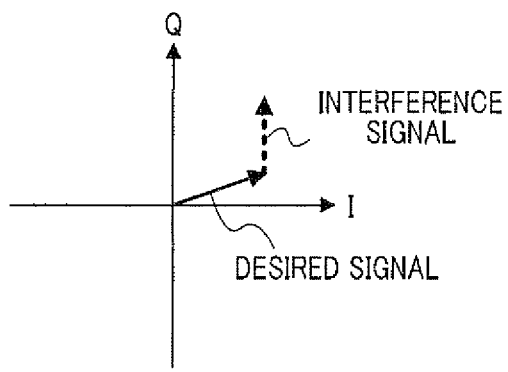
FIG. 2B is a concept diagram showing a symbol of subcarrier 42.
Figure 2C:
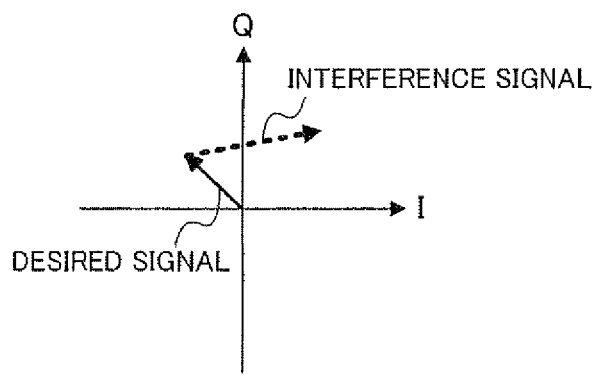
FIG. 2C is a concept diagram showing a symbol of subcarrier #3.
Figure 2D:
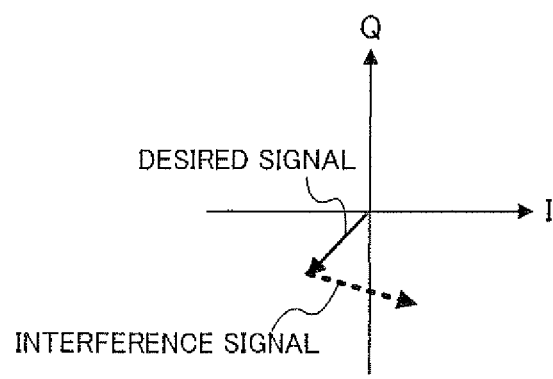
FIG. 2D is a concept diagram showing a symbol of subcarrier #4.
Figure 4:
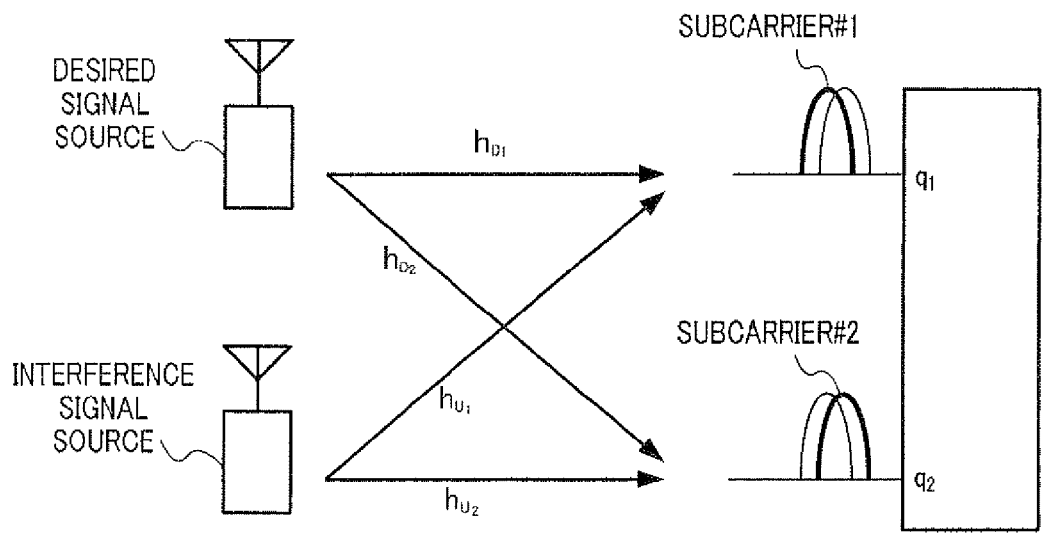
FIG. 4 is a diagram illustrating the operation principle of the present invention.

Therefore, when N interference signal sources are provided, regardless of the number of multipaths, it naturally follows that a signal is received where one desired signal and N interference signals are combined per subcarrier #1 to #4 of an OFDM symbol. In other words, when N interference signal sources are provided, regardless of the number of multipaths, it naturally follows that a desired signal with one-path Rayleigh fading and N interference signals with one-path Rayleigh fading are provided per subcarrier. FIGS. 2A to 2D illustrate this state. FIG. 2A illustrates a symbol of subcarrier #1, FIG. 2B illustrates a symbol of subcarrier #2, FIG. 2C illustrates a symbol of subcarrier #3 and FIG. 4 illustrates a symbol of subcarrier #4. As shown in these figures, in subcarriers #1 to #4 each, a symbol where an interference signal is added to the desired signal is received. Accordingly, in OFDM, when there are N interference signal sources, regardless of the number of multipaths, it is possible to obtain a desired signal by canceling N interference signals from a received signal in sub carriers.

Thus, characteristics of a received OFDM signal include providing, even in a multipath environment where, in single-carrier transmission, a signal subjected to frequency selective fading is received, an OFDM received signal influenced by Rayleigh fading per subcarrier.

Meanwhile, characteristics of the AAA technique require N+1 antennas receiving a signal where one desired signal and N interference signals are combined to cancel N interference signals. At this point, signals received at N+1 antennas include the desired signals and interference signals. Then, these signals received at the antennas are multiplied by a weight obtained by MMSE processing so that, by combining signals after weight multiplication, it is possible to cancel N interference signals from the received signal and obtain the desired signal.

In view of the above, the characteristics of the received OFDM signal and AAA technique include having subcarriers #1 to #4 shown in FIG. 1 as antennas in the AAA technique, mapping the same symbols as desired signals on four subcarriers of subcarriers #1 to #4 forming an OFDM symbol and performing the same MMSE processing on subcarriers #1 to #4 as in the AAA technique, so that, even when a number of multipaths exist in OFDM-scheme radio communication, a mobile station can cancel all the interference signals transmitted from three interference signal sources. Further, the mobile station does not require a plurality of antennas but requires only one antenna regardless of the number of multipaths, so that the mobile station can cancel all the interference signals transmitted from three interference signal sources. In other words, to cancel interference signals transmitted from N interference signal sources from a received signal, even when there are a plurality of multipaths, OFDM communication requires one antenna in a mobile station and N+1 subcarriers in which the same symbols are mapped as desired signals.

Thus, the present invention cancels the interference signal included in the OFDM symbol by using a plurality of subcarriers on which a plurality of same symbols are mapped, as a plurality of antennas in the AAA technique, and by performing MMSE processing on the plurality of same symbols in the frequency domain.

To be more specific, this can be described as follows.

In the AAA technique, received signal $R_n$ at antenna n is represented by equation 1, where D is a desired signal, U is an interference signal, $h_{Dn}$ is a channel estimation value of the channel of the desired signal at an antenna n, and $h_{Un}$ is a channel estimation value of the channel of the interference signal at antenna n.

$$R_n = D \cdot h_{Dn} + U \cdot h_{Un} \quad \text{(Equation 1)}$$

Then, it is possible to cancel interference signal U from received signal $R_n$ and obtain desired signal D by multiplying and combining weight $W_n$ at antenna n obtained by MMSE processing according to equation 2 and a signal received at antenna n. In addition, in equation 2, P is a P vector generated from channel estimation value $h_{Dn}$ and channel estimation value $h_{Un}$.

$$W_n = R^{-1} \cdot P \quad \text{(Equation 2)}$$

Figure 3:
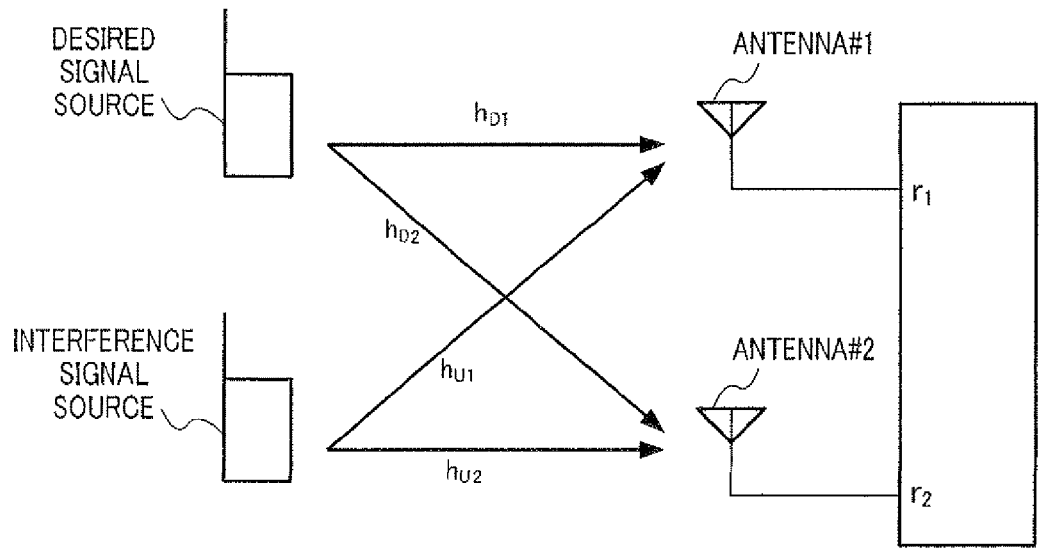
FIG. 3 is a diagram illustrating the operation principle of AAA technique.

Accordingly, for example, as shown in FIG. 3, when there is one interference signal source and the receiver side has two antennas, in the AAA technique, a received signal at antennas is obtained using equation 3.

(Equation 3)

$$\begin{pmatrix} r_1 \\ r_2 \end{pmatrix} = \begin{pmatrix} h_{d1} & h_{u1} \\ h_{d2} & h_{u2} \end{pmatrix} \begin{pmatrix} d \\ u \end{pmatrix} \quad [3]$$

Meanwhile, in the present invention, received signal $Q_m$ on subcarrier m is represented by equation 4, where D is a desired signal, U is an interference signal, $h_{Dm}$ is a channel estimation value of the channel in subcarrier m of the desired signal, and $h_{Um}$ is a channel estimation value of the channel in subcarrier m of the interference signal.

$$Q_m = D \cdot h_{Dm} + U \cdot h_{Um} \qquad \text{(Equation 4)}$$

Then, it is possible to cancel interference signal U from received signal $Q_m$ and obtain desired signal D by multiplying and combining weight $W_m$ in subcarrier m obtained by MMSE processing according to equation 5 and a signal received in subcarrier m. In addition, in equation 5, P is a P vector generated from channel estimation value $h_{Dm}$ and channel estimation value $h_{Um}$.

$$W_m = Q^{-1} \cdot P \qquad \text{(Equation 5)}$$

Accordingly, for example, as shown in FIG. 4, when there is one interference signal source and the receiver side receives an OFDM symbol formed with two subcarriers at one antenna, the received signal in the subcarriers is obtained by equation 6.

(Equation 6)

$$\begin{pmatrix} q_1 \\ q_2 \end{pmatrix} = \begin{pmatrix} h_{d1} & h_{u1} \\ h_{d2} & h_{u2} \end{pmatrix} \begin{pmatrix} d \\ u \end{pmatrix} \qquad [6]$$

Here, upon comparison with equations 1 to 3 and equations 4 to 6, antenna number n is replaced with subcarrier number m and the other numbers are represented by the same equations. Thus, this means that it is possible to cancel interference signals from OFDM symbols by utilizing a plurality of subcarriers of the OFDM symbol as a plurality of antennas in the AAA technique and by performing the same MMSE processing as in the AAA technique on the plurality of subcarriers of the OFDM symbol received at one antenna.

Embodiments of the present invention will be explained below in detail with reference to the accompanying drawings.

Embodiment 1

Figure 5:
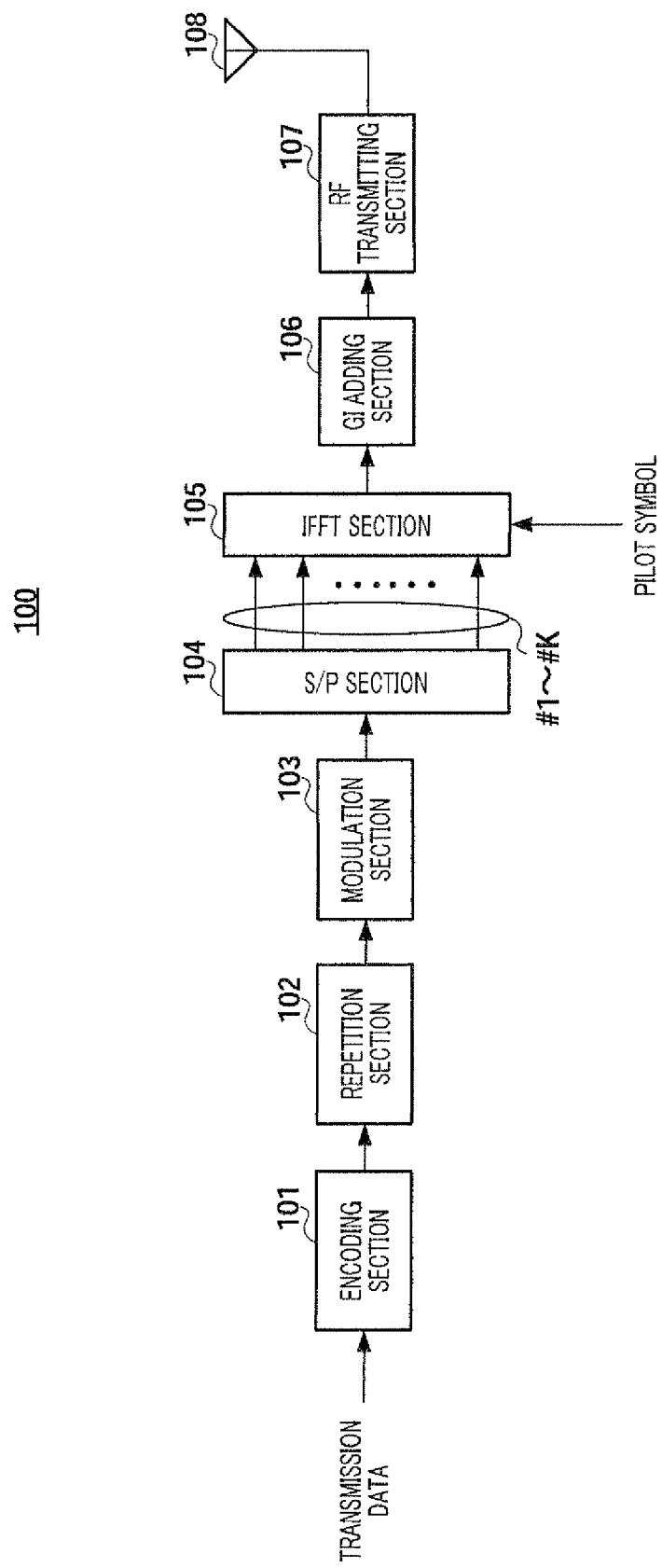
FIG. 5 is a block diagram showing a configuration of a base station according to Embodiment 1 of the present invention.
Figure 12:
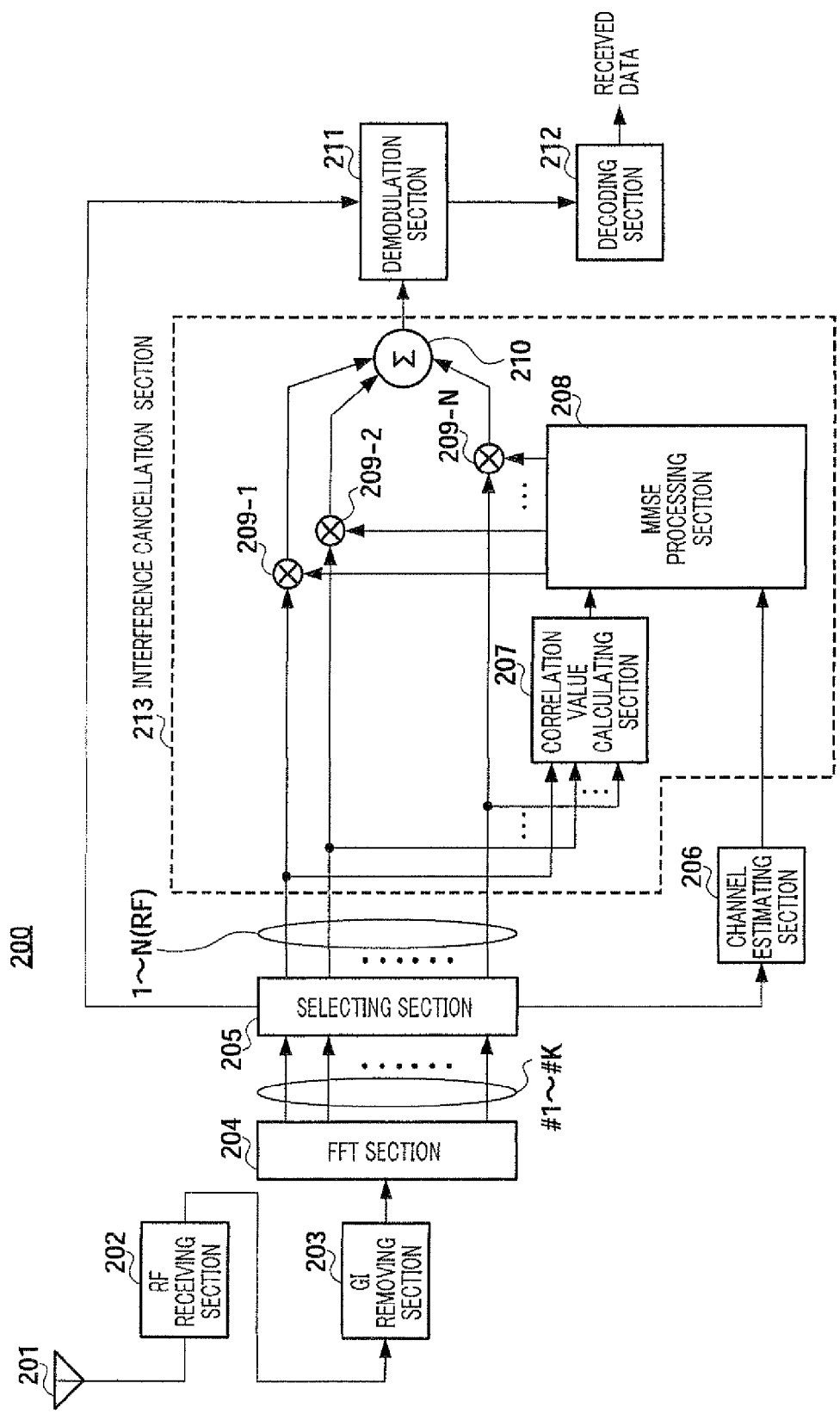
FIG. 12 is a block diagram showing a configuration of a mobile station according to Embodiment 1 of the present invention.

FIG. 5 shows a configuration of a radio communication base station apparatus (hereinafter "base station") 100 according to the present embodiment. Further, FIG. 12 shows a configuration of mobile station 200 according to the present embodiment.

In base station 100 shown in FIG. 5, encoding section 101 encodes transmission data (transmission bit). For example, encoding section 101 performs error correcting encoding on transmission data (transmission bit) using a systematic code such as a turbo code. Encoding section 101 generates a bit sequence comprised of systematic bit (S) representing a transmission bit and parity bit (P) representing a redundant bit, by encoding the transmission bit using the systematic code. Here, although a case has been described as an example of error correcting encoding which uses the systematic code and which is most frequently used in mobile communication, the present invention is not limited to types of coding.

Repetition section 102 repeats (i.e., duplicate) a parity bit as a repetition target, in a plurality of bits included in the bit sequence generated by encoding section 101, to perform rate matching. This repetition will be described later in detail.

Further, although a case has been described with the present embodiment where, assuming a communication system where a parity bit is repeated preferentially upon rate matching, the parity bit is preferentially made a repetition target, a systematic bit is preferentially made a repetition target in communication system where a systematic bit is repeated preferentially upon rate matching. Further, in a communication system where there is no such priority, both a parity bit and systematic bit may be made the repetition target.

Modulation section 103 modulates the bit sequence after repetition and generates a symbol. This modulation will be described later in detail.

Every time S/P section 104 receives as input, K symbols, inputted in series from modulation section 103, corresponding to a plurality of subcarriers #1 to #K forming an OFDM symbol that is a multicarrier signal, S/P section 104 transforms these symbols into parallel symbols and outputs the transformed symbols to IFFT section 105.

IFFT section 105 performs IFFT (Inverse Fast Fourier Transform) processing on the symbols inputted from S/P section 104, maps (arranges) the transformed symbols on subcarriers #1 to #K according to a predetermined mapping pattern (arrangement pattern) and generates an OFDM symbol. Further, at the beginning of the frame, IFFT section 105 performs IFFT processing on a pilot symbol (PL), maps the transformed pilot symbols on subcarriers #1 to #K and generates the OFDM symbol. The OFDM symbol generating method will be described later in detail.

The OFDM symbol generated as above is added a guard interval in GI adding section 106, subjected to predetermined radio processing such as up-conversion in RF transmitting section 107 and transmitted by radio from antenna 108 to mobile station 200 (shown in FIG. 12).

Next, repetition and modulation will be explained below in detail.

Figure 6:
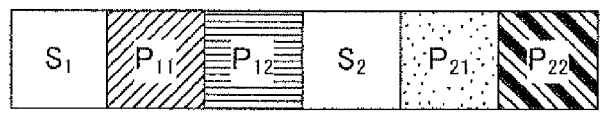
FIG. 6 is a diagram showing a coding bit sequence (first bit sequence) according to Embodiment 1 of the present invention.

Here, coding rate R of encoding section 101 is ⅓. That is, encoding section 101 generates one systematic bit S and two parity bits P for one transmission bit. Consequently, when two transmission bits $B_1$ and $B_2$ to be consecutively inputted to encoding section 101 are encoded, as shown in FIG. 6, $S_1$, $P_{11}$ and $P_{12}$ are generated from $B_1$ and $S_2$, $P_{21}$ and $P_{22}$ are generated from $B_2$. That is, encoding section 101 encodes transmission bits $B_1$ and $B_2$ and generates a bit sequence formed with $S_1$, $P_{11}$, $P_{12}$, $S_2$, $S_{21}$ and $S_{22}$ (first bit sequence).

Figure 7:
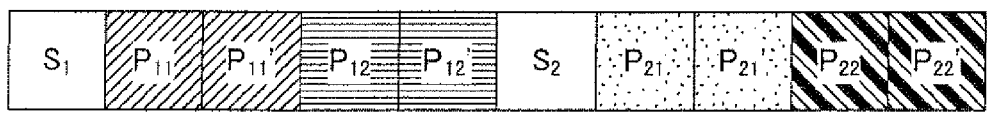
FIG. 7 is a diagram showing a bit sequence (second bit sequence) after repetition according to Embodiment 1 of the present invention.

Repetition section 102 repeats only patity bits of a plurality of bits $S_1$, $P_{11}$, $P_{12}$, $S_2$, $P_{21}$ and $P_{22}$ included in the first bit sequence shown in FIG. 6 as a repetition target. Here, repetition factor RF is two. Accordingly, the bit sequence after repetition (second bit sequence) is as shown in FIG. 7 and two same parity bits each are obtained with RF=2. In FIG. 7, $P_{11}$, $P_{12}$, $P_{21}$ and $P_{22}$ are parity bits of the repetition source and $P_{11}'$, $P_{12}'$, $P_{21}'$ and $P_{22}'$ are parity bits generated by repetition. That is, $P_{11}$ and $P_{11}'$, $P_{12}$ and $P_{12}'$, $P_{21}$ and $P_{21}'$, and $P_{22}$ and $P_{22}'$ are the same bits, respectively. As described above, repetition section 102 repeats parity bits of a plurality of bits included in the first bit sequence and generates the second bit sequence including a parity bit of the repetition source (first parity bit) and a parity bit generated by repetition (second parity bit).

Modulation section 103 modulates the second bit sequence and generates a symbol. Here, as a modulation scheme, QPSK where one symbol is formed with two bits is used. Upon modulating the second bit sequence, modulation section 103 generates a plurality of same symbols as symbols that can be generated only from parity bits $P_{11}$, $P_{12}$, $P_{21}$ and $P_{22}$ of the repetition source. Parity bits of the repetition source are four, $P_{11}$, $P_{12}$, $P_{21}$ and $P_{22}$, and, when a modulation scheme is QPSK, a symbol that can be generated from these four parity bits is one of six combinations of $(P_{11}, P_{12})$, $(P_{21}, P_{22})$, $(P_{11}, P_{21})$, $(P_{12}, P_{22})$, $(P_{11}, P_{22})$ and $(P_{12}, P_{21})$. Further, if a plurality of same symbols as one of these six symbols are generated from the second bit sequence shown in FIG. 7, the combination pattern is one of FIGS. 8 to 10. Here, modulation section 103 generates symbol $SB_1$ from systematic bits $S_1$ and $S_2$ in cases of FIGS. 8 to 10.

Figure 8:
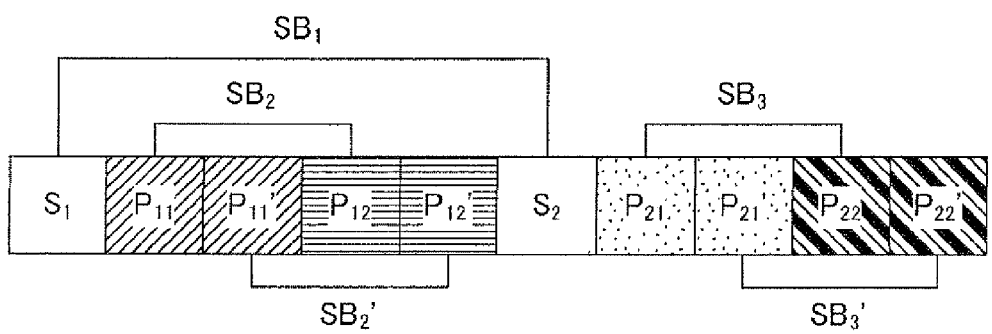
FIG. 8 is a diagram showing a symbol generation pattern (pattern 1) according to Embodiment 1 of the present invention.

With the combination pattern shown in FIG. 8, symbol $SB_2$ is generated from ($P_{11}$, $P_{12}$), symbol $SB_2'$ is generated from ($P_{11}'$, $P_{12}'$), symbol $SB_3$ is generated from ($P_{21}$, $P_{22}$) and symbol $SB_3'$ is generated from ($P_{21}'$, $P_{22}'$). Further, with the combination pattern shown in FIG. 9, symbol $SB_2$ is generated from ($P_{11}$, $P_{21}$), symbol $SB_2'$ is generated from ($P_{11}'$, $P_{21}'$), symbol $SB_3$ is generated from ($P_{12}$, $P_{22}$) and symbol $SB_3'$ is generated from ($P_{12}'$, $P_{22}'$). Further, with the combination pattern shown in FIG. 10, symbol $SB_2$ is generated from ($P_{11}$, $P_{22}$), symbol $SB_2'$ is generated from ($P_{11}'$, $P_{22}'$), symbol $SB_3$ is generated from ($P_{12}$, $P_{21}$) and symbol $SB_3'$ is generated from ($P_{12}'$, $P_{21}'$). Here, in all cases, $SB_2$ and $SB_2'$ are the same symbol, and $SB_3$ and $SB_3'$ are the same symbol.

Figure 9:
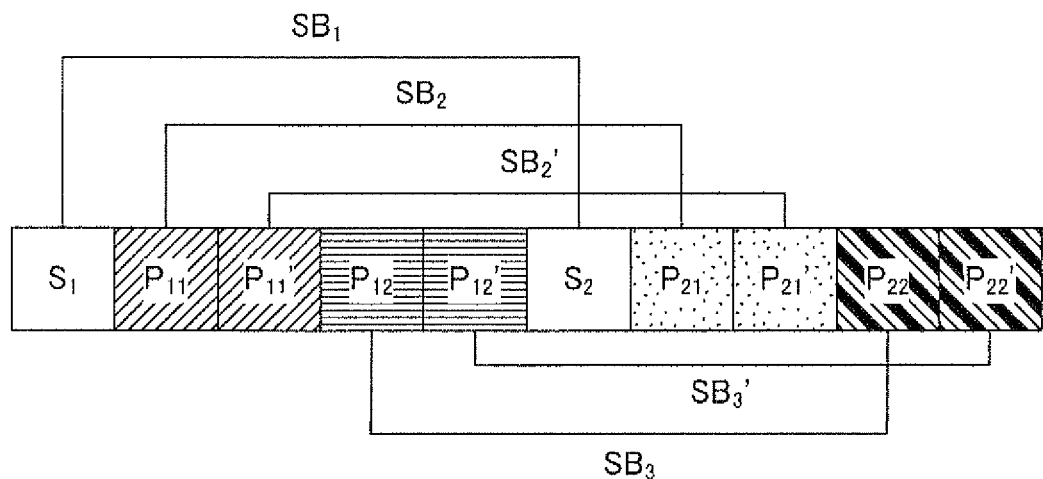
FIG. 9 is a diagram showing a symbol generation pattern (pattern 2) according to Embodiment 1 of the present invention.
Figure 10:
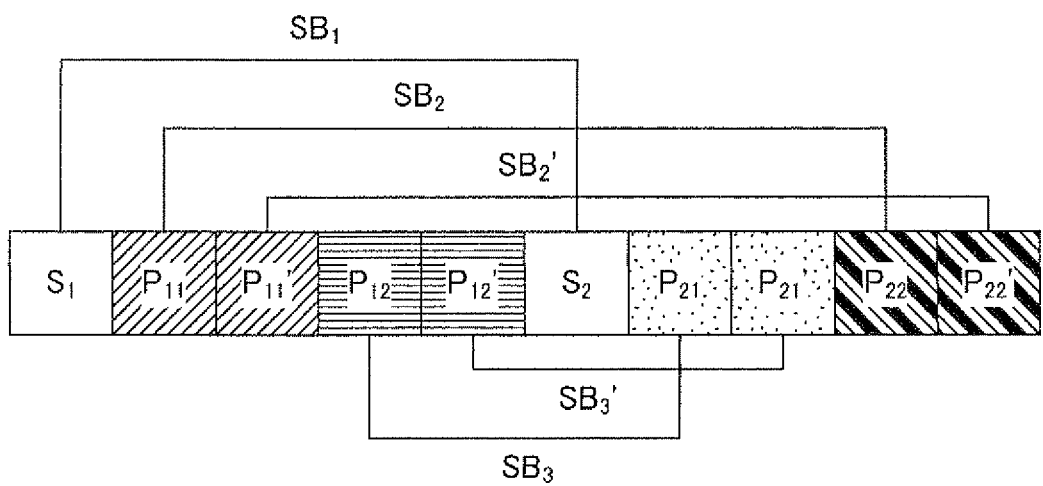
FIG. 10 is a diagram showing a symbol generation pattern (pattern 3) according to Embodiment 1 of the present invention.

As described above, according to one of combination patterns shown in FIGS. 8 to 10, modulation section 103 can generate a plurality of same symbols as symbols that can be generated only from parity bits $P_{11}$, $P_{12}$, $P_{21}$ and $P_{22}$ of the repetition source. Further, when repetition section 102 performs bit repetition with RF=2, it is possible to yield the same result as in the case of performing symbol repetition with RF=2 by the processing in modulation section 103.

Although an example has been described above where QPSK is used as the modulation scheme, it is also possible to generate a plurality of same symbols as symbols that can be generated only from parity bits of the repetition source, in the same manner using other modulation schemes. For example, when 16QAM is used as the modulation scheme, symbol $SB_2$ is generated from ($P_{11}$, $P_{12}$, $P_{21}$, $P_{22}$) and $SB_2'$ is generated from ($P_{11}'$, $P_{12}'$, $P_{21}'$, $P_{22}'$).

Further, in the above explanation, for ease of explanation, a bit position in a symbol is not considered. For example, ($P_{11}$, $P_{12}$) and ($P_{12}$, $P_{11}$) are regarded as the same combination in the above explanation. However, for example, even when a symbol is generated from ($P_{12}$, $P_{11}$) instead of ($P_{11}$, $P_{12}$), a bit position is replaced in the symbol as in the case of other symbols, so that, as described above, it is possible to generate a plurality of same symbols as symbols that can be generated only from parity bits of the repetition source.

Further, although a case has been described above where a symbol is generated from the combination of parity bits of the repetition source or generated parity bits, the parity bits of the repetition source and the generated parity bits are the same bits, and, consequently, it is possible to generate a symbol by combining the parity bit of the repetition source and the parity bit generated by repetition. For example, in the combination pattern shown in FIG. 8, it is possible to generate $SB_2$ from ($P_{11}$, $P_{12}'$), $SB_2'$ from ($P_{11}'$, $P_{12}$), $SB_3$ from ($P_{21}$, $P_{22}'$) and $SB_3'$ from ($P_{21}'$, $P_{22}$). This applies to FIGS. 9 and 10 in the same manner.

As described above, modulation section 103 modulates the second bit sequence outputted from repetition section 102 and generates a plurality of same symbols as symbols that can be generated only from parity bits of the repetition source, from parity bits of the repetition source and parity bits generated by repetition.

Next, generating an OFDM symbol will be explained in detail. Here, one OFDM symbol is comprised of five subcarriers #1 to #5 (K=5).

Figure 11:
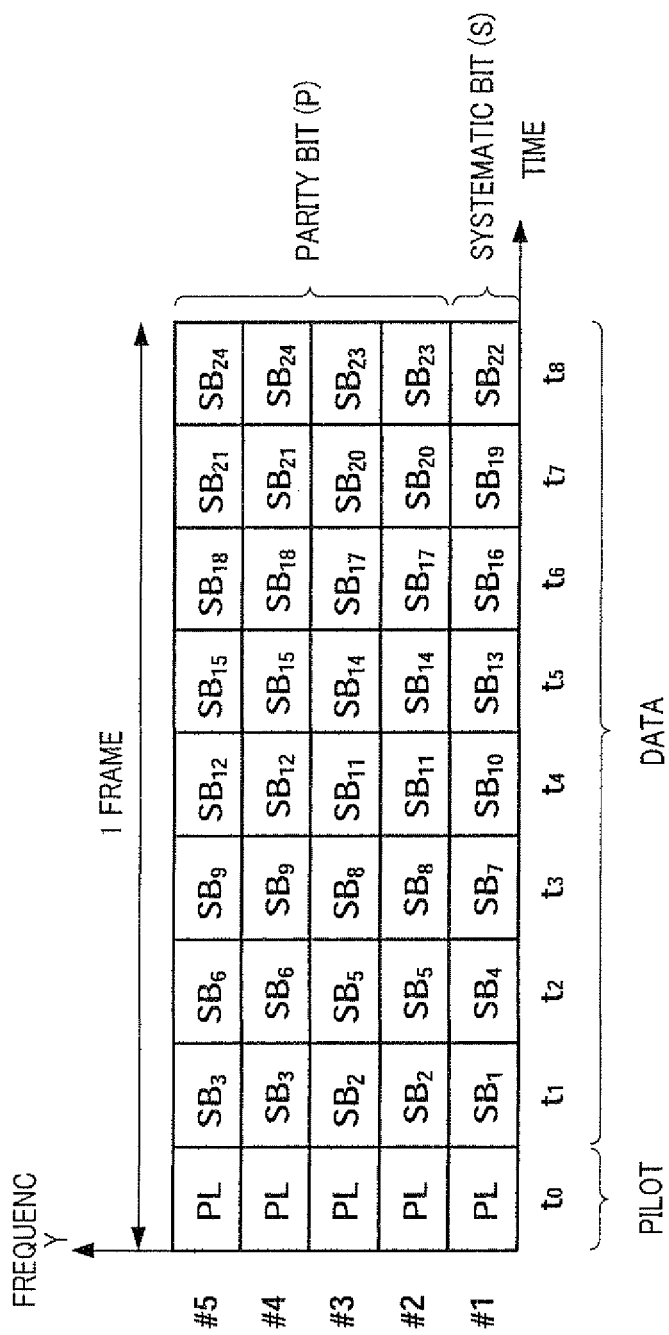
FIG. 11 is a diagram showing a mapping pattern according to Embodiment 1 of the present invention.

Here, when RF=2 and a frame is comprised of nine OFDM symbols (one OFDM symbol formed with pilot symbols and eight OFDM symbols formed with data symbols), a mapping pattern in the present embodiment is as shown in FIG. 11, for example. That is, symbols $SB_1$, $SB_4$, $SB_7$, $SB_{10}$, $SB_{13}$, $SB_{16}$, $SB_{19}$ and $SB_{22}$ formed with systematic bits are mapped on subcarrier #1, and symbols $SB_2$, $SB_3$, $SB_5$, $SB_6$, $SB_8$, $SB_9$, $SB_{11}$, $SB_{12}$, $SB_{14}$, $SB_{15}$, $SB_{17}$, $SB_{18}$, $SB_{20}$, $SB_{21}$, $SB_{23}$ and $SB_{24}$ formed with parity bits and repeated in the frequency domain with RF=2, are mapped on subcarriers #2 to #5. That is, for parity bits, the same symbols are mapped on two different subcarriers and transmitted to mobile station 200 (FIG. 12).

However, when mobile station 200 cancels the interference signal from the received signal and obtains the desired signal, the mapping pattern of desired signals subjected to repetition on subcarriers and the mapping pattern of interference signals subjected to repetition on subcarriers need to be the same in the frequency domain. In other words, when mobile station 200 cancels the interference signal from the received signal and obtains the desired signal, the desired signal and the interference signal needs to be mapped in the frequency domain according to the same mapping pattern. In other words, when the same symbols of the desired signals are mapped on subcarriers #2 and #3 or subcarriers #4 and #5 as shown in FIG. 11, the same symbols of the interference signals need to be mapped on subcarriers #2 and #3 or subcarriers #4 and #5 in the same way as above.

Therefore, with the present embodiment, IFFT section 105 generates multicarrier signals by mapping a plurality of same symbols on a plurality of subcarriers according to the same mapping pattern as a mapping pattern of interference signals. For example, IFFT section 105 generates multicarrier signals by mapping a plurality of same symbols on a plurality of subcarriers according to the same mapping pattern as a mapping pattern of other base stations employing the same configuration shown in FIG. 5. By this means, the mapping pattern of desired signals subjected to repetition for subcarriers and the mapping pattern of interference signals subjected to repetition for subcarriers become the same in the frequency domain, so that mobile station 200 can reliably cancel the interference signals from the received signal.

Next, mobile station 200 (FIG. 12) will be explained.

Mobile station 200 shown in FIG. 12 receives an OFDM symbol transmitted from base station 100 through antenna 201. At this point, the received. OFDM symbol includes interference signals transmitted from interference signal sources in addition to the desired signal transmitted from base station 100. These interference signals include OFDM symbols having the subcarriers #1 to #5 with same frequencies as subcarriers #1 to #5 of the OFDM symbols transmitted from base station 100, such as OFDM symbols transmitted from base stations other than base station 100 and OFDM symbols transmitted from mobile stations other than mobile station 200. When antenna 108 of base station 100 is a sector antenna comprised of a plurality of antennas, interference signals include an OFDM symbol transmitted from antennas of sectors other than the sector where mobile station 200 is located.

The OFDM symbol including the desired signal and interference signals are subject to predetermined radio processing such as down-conversion in RF receiving section 202, removed the guard interval in GI removing section 203 and inputted to FFT section 204.

FFT section 204 performs FFT (Fast Fourier Transform) processing on the OFDM symbol inputted from GI removing section 203 and obtains the symbols mapped on subcarriers #1 to #5. These symbols are inputted to selecting section 205.

In case of OFDM symbols at the beginning of the frame, selecting section 205 outputs the pilot symbols mapped on subcarriers #1 to #5 to channel estimating section 206.

Further, selecting section 205 selects symbols comprised of systematic bits according to the mapping pattern upon generation of OFDM symbols in base station 100 and outputs the symbols to demodulation section 211. To be more specific, in FIG. 11, at $t_1$, selecting section 205 selects symbol $SB_1$ mapped on subcarrier #1 and outputs the symbol. The flow is the same at $t_2$ to $t_8$.

Further, selecting section 205 selects a plurality of same symbols comprised of parity bits according to the mapping pattern upon generation of OFDM symbols in base station 100 and outputs the selected symbols to correlation value calculating section 207 and multipliers 209-1 to 209-N. To be more specific, in FIG. 11, at $t_1$, selecting section 205 first selects and outputs two same symbols $SB_2$ and $SB_2'$ mapped on subcarriers #2 and #3, and then selects and outputs two same symbols $SB_3$ and $SB_3'$ mapped on subcarriers #4 to #5. Accordingly, in FIG. 12, the equation of N=RF=2 holds. Further, these two same symbols are added interference signals. In other words, selecting section 205 sequentially selects and outputs the same symbols that are added interference signals. The flow is the same at $t_2$ to $t_8$.

Channel estimating section 206 obtains channel estimation values of subcarriers #2 to #5 using the inputted pilot symbols. Then, channel estimating section 206 generates and outputs a P vector using the channel estimation values to MMSE processing section 208. For example, at $t_1$ when selecting section 205 selects two same symbols $SB_2$ and $SB_2'$ mapped on subcarriers #2 to #3, channel estimating section 206 generates a P vector shown in equation 7 using channel estimation values $h_2$ to $h_3$ of subcarriers #2 to #3. The same flow is applied to other symbols comprised of parity bits. In addition, the channel estimation value is calculated based on the pilot symbol at the beginning of the frame and the same channel estimation values are used over a one frame per subcarrier.

(Equation 7)

$$P = \begin{pmatrix} h_2 \\ h_3 \end{pmatrix} \quad [7]$$

Correlation value calculating section 207 calculates cross-correlation values between subcarriers of the same symbol. For example, when the two same symbols $SB_2$ and $SB_2'$ mapped on subcarriers #2 to #3 are inputted, correlation value calculating section 207 calculates cross-correlation values of these two symbols between subcarriers #2 to #3. Then, correlation value calculating section 207 generates an R matrix from the cross-correlation values, obtains the inverse matrix of the R matrix and outputs the obtained inverse matrix to MMSE processing section 208. For example, at t1 when selecting section 205 selects the two same symbols $SB_2$ and $SB_2'$ mapped on subcarriers #2 to #3, correlation value calculating section 207 generates an R matrix represented by equation 8 using cross-correlation values $x_{22}$ to $x_{33}$ between subcarriers #2 to #3. The same flow is applied to other symbols comprised of parity bits.

(Equation 8)

$$R = \begin{pmatrix} x_{22} & x_{32} \\ x_{23} & x_{33} \end{pmatrix} \quad [8]$$

MMSE processing section 208 performs MMSE processing on the P vector (P) inputted from channel estimating section 206 and inverse matrix ($R^{-1}$) of the R matrix inputted from correlation value calculating section 207 using matrix operation represented by equation 9, obtains weights W ($W_1$ to $W_2$) and outputs the weights to multipliers 209-1 to 209-N. The same flow is applied to other symbols comprised of parity bits. In addition, such a weight generating method is known widely as the SMI (Sample Matrix Inverse) method in the AAA technique.

$$W = R^{-1} \cdot P \quad \text{(Equation 9)}$$

Multipliers 209-1 to 209-N multiply the symbols selected in selecting section 205 by the weights obtained in MMSE processing section 208.

Combining section 210 combines symbols after weight multiplication and generates a combined signal. The symbols combined in combining section 210 are the same as the symbols mapped on a plurality of different subcarriers, so that it is possible to cancel the interference signals from symbols comprised of parity bits by combining the symbols between the subcarriers. With the present invention, subcarriers of an OFDM symbol corresponds to antennas in the AAA technique, so that, regardless of the number of multipaths, it is possible to cancel all the interference signals from RF-1 (i.e., one) interference signal source, from symbols with RF=2.

Here, interference cancellation section 213 is formed with correlation value calculating section 207, MMSE processing section 208, multipliers 209-1 to 209-N and combining section 210.

Thus, generated combined signal is demodulated in demodulation section 211 and decoded in decoding section 212. The received data of parity bits is thereby obtained. Further, symbols comprised of systematic bits are similarly demodulated in demodulation section 211 and decoded in decoding section 212. The received data of systematic bits is thereby obtained.

Thus, in the present embodiment, regardless of the number of multipaths, it is possible to cancel all the interference signals from RF-1 interference signal source by utilizing a plurality of subcarriers of an OFDM symbol as a plurality of antennas in the AAA technique and by performing the same MMSE processing as in the AAA technique on the plurality of subcarriers of the OFDM symbol. Accordingly, the mobile station does not require a large number of antennas as the conventional AAA technique but requires only one antenna for canceling interference signals, so that, regardless of the number of multipaths, it is possible to avoid making the apparatus larger for canceling interference signals. Further, although the AAA technique increases the number of receiving antennas following an increase in the number of interference signal sources and the number of multipaths, in the present embodiment, even when the number of interference signal sources increases, it is possible to efficiently cancel interference signals by only increasing RF regardless of an increase of the number of multipaths.

Embodiment 2

Figure 13:
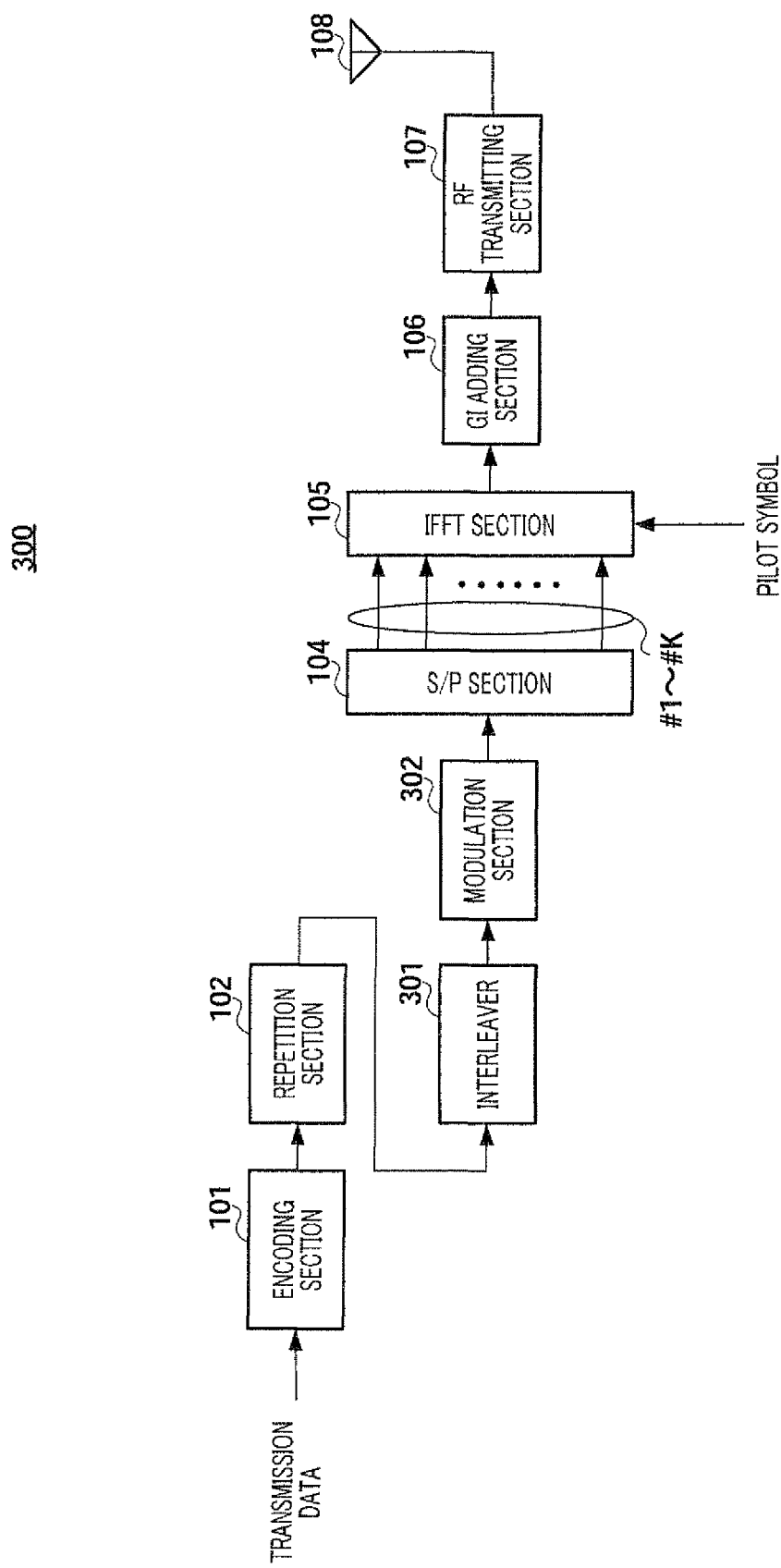
FIG. 13 is a block diagram showing a configuration of a base station according to Embodiment 2 of the present invention.

FIG. 13 shows a configuration of base station 300 according to the present embodiment Base station 300 further has interleaver 301 in the configuration of base station 100 (FIG. 5) according to Embodiment 1.

Figure 14:
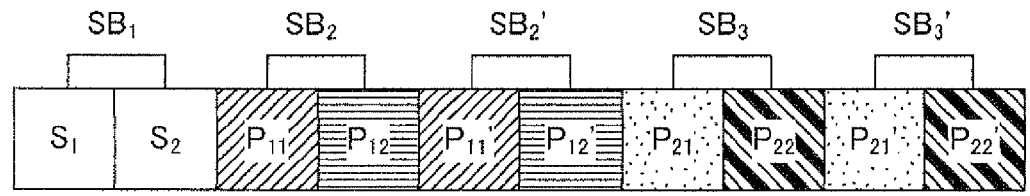
FIG. 14 is a diagram showing an interleaving pattern (pattern 1) according to Embodiment 2 of the present invention.
Figure 15:
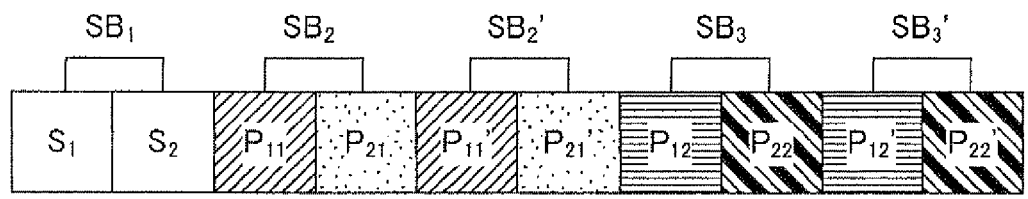
FIG. 15 is a diagram showing an interleaving pattern (pattern 2) according to Embodiment 2 of the present invention.
Figure 16:
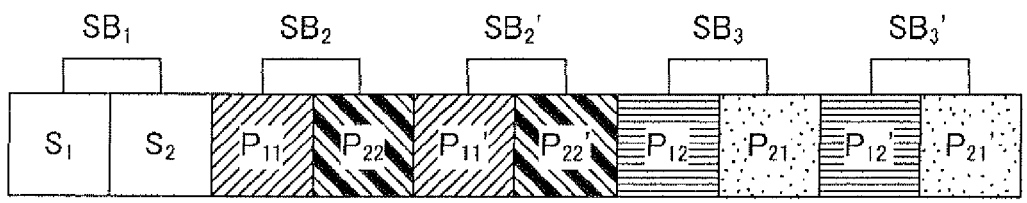
FIG. 16 is a diagram showing an interleaving pattern (pattern 3) according to Embodiment 2 of the present invention.

Interleaver 301 interleaves the second bit sequence shown in FIG. 7 and outputted from repetition section 102 into one of the sequences shown in FIGS. 14 to 16. Here, FIGS. 14, 15 and 16 correspond to FIGS. 8, 9 and 10 of Embodiment 1, respectively. That is, interleaver 301 performs interleaving according to one of combination patterns shown in FIGS. 8 to 10 and inputs the interleaved second bit sequence to modulation section 302.

Modulation section 302 modulates the interleaved second bit sequence and generates symbols. Modulation section 302 modulates bits of the bit sequences shown in FIGS. 14 to 16 according to an input order. Modulation section 302 is different from modulation section 103 of Embodiment 1 in this regard. Here, as in Embodiment 1, QPSK where one symbol is formed with two bits is used as a modulation scheme. Therefore, when interleaver 301 performs interleaving as shown in FIG. 14, symbol $SB_2$ is generated from $(P_{11}, P_{12})$, symbol $SB_2'$ is generated from $(P_{11}', P_{12}')$, symbol $SB_3$ is generated from $(P_{21}, P_{22})$ and symbol $SB_3'$ is generated from $(P_{21}', P_{22}')$. Further, when interleaver 301 performs interleaving as shown in FIG. 15, symbol $SB_2$ is generated from $(P_{11}, P_{21})$, symbol $SB_2'$ is generated from $(P_{11}', P_{21}')$, symbol $SB_3$ is generated from $(P_{12}, P_{22})$ and symbol $SB_3'$ is generated from $(P_{12}'', P_{22}')$. Further, when interleaver 301 performs interleaving as shown in FIG. 16, symbol $SB_2$ is generated from $(P_{11}, P_{22})$, symbol $SB_2'$ is generated from $(P_{11}', P_{22}')$, symbol $SB_3$ is generated from $(P_{12}, P_{21})$ and symbol $SB_3'$ is generated from $(P_{12}', P_{21}')$. Here, in all cases, $SB_2$ and $SB_2'$ are the same symbol, and $SB_3$ and $SB_3'$ are the same symbol. Further, in all cases of FIGS. 14 to 16, symbol $SB_1$ is generated from systematic bits $S_1$ and $S_2$.

As described above, in interleaving shown in FIGS. 14 to 16, as in Embodiment 1, modulation section 302 can generate a plurality of same symbols as symbols that can be generated only from parity bits $P_{11}$, $P_{12}$, $P_{21}$ and $P_{22}$ of the repetition source. Further, when repetition section 102 performs bit repetition with RF=2, by performing this interleaving, it is possible to obtain the same result as obtained by performing symbol repetition with RF=2 as in Embodiment 1.

As described above, modulation section 302 modulates the second bit sequence outputted from interleaver 301 and generates a plurality of same symbols as symbols that can be generated only from parity bits of the repetition source, from parity bits of the repetition source and parity bits generated by repetition.

Here, components other than interleaver 301 and modulation section 302 are the same as Embodiment 1 (FIG. 5) and explanations thereof will be omitted.

As described above, with the present embodiment, it is possible to obtain the same effect as in Embodiment 1, and make processing in a modulation section easier than in Embodiment 1 by providing the above interleaver.

Embodiments of the present invention have been explained above.

Further, the present embodiment is particularly effective in a mobile communication system where a communication area (cell) that one base station covers is divided into a plurality of sectors in the angular directions by sector antennas having directivity. Signals transmitted to the plurality of divided sectors are transmitted from a plurality of antennas of one base station, and an interference signal level is likely to be higher in inter-sector interferences than inter-cell interferences regardless of a place where the mobile station is positioned. The effect of improving the SIR (Signal to Interference Ratio) is small for the inter-sector interference than for inter-cell interference when the desired signal level is increased, so that it is possible to enhance the effect of improving the SIR by suppressing the interference signal level as in the present embodiment. When a base station has a plurality of sectors, signals are transmitted to adjacent sectors from one base station, the base station makes it easy to make the mapping patterns of the desired signal and the interference signal the same in a mobile station. In other words, when the mapping patterns adaptively change depending on, for example, a communication situation, signaling is required between base stations in different cells for matching mapping patterns between the adjacent cells and processing is required only in one base station for matching mapping patterns between adjacent sectors.

In addition, although a case has been described with above embodiments where MMSE is used as an interference cancellation algorithm, the interference cancellation algorithm is not limited to MMSE and algorithms that are interference cancellation algorithms used in the AAA technique may be used. For example, it is possible to use, for example, null steering, beam forming, LMS, RLS and CMA.

Further, it is possible to use the stream segregation algorithm used in MIMO communication. When the stream segregation algorithm used in MIMO communication is used, it is possible to obtain the following effect.

That is, mobile communication systems is increasingly required to perform MIMO reception to respond to a higher data rate, and, consequently, may use the stream segregation algorithm not only for the stream segregation algorithm in MIMO reception processing, but also for interference canceling processing by using the stream segregation algorithm as the interference cancellation algorithm, so that it is possible to simplify the circuit configuration of the receiver. Further, by using the stream segregation algorithm as the interference cancellation algorithm, it eliminates the necessity of operation of the cross-correlation matrix required for using MMSE, so that it is possible to cancel interference signals reliably when the number of symbols of the received signal is small. Furthermore, it is possible to switch adaptively between MIMO reception processing and interference canceling processing according to the propagation environment between a base station and a mobile station or the distance between the base station and the mobile station. For example, when the mobile station is located relatively near the base station and is moving at a low speed, it is possible to improve a transmission rate by performing MIMO reception processing using the stream segregation algorithm, and, when the mobile station is located at the cell edge or sector edge, it is possible to improve the SINR by performing interference canceling processing of the present invention using the stream segregation algorithm.

Further, although, in MIMO reception processing, stream segregation weights are calculated using channel estimation values per stream and per antenna, when interference canceling processing is performed using the stream segregation algorithm, stream segregation weights may be calculated using channel estimation values per transmitting station and per subcarrier.

Further, although cases have been described with the above embodiments where a mobile station, which is a receiving station, has one antenna, it is possible to combine the present invention and a radio receiving apparatus having two antennas or more. For example, when, in a radio receiving apparatus, the number of antennas is N and the repetition factor (RF) is L, it is possible to cancel N×L−1 interference signals by applying the present invention. In other words, the present invention is able to support radio communication systems where the sum of the number of desired signal sources and the number of interference signal sources is N×L at the maximum.

Further, although cases have been described with the above embodiments where a base station is a transmitting station (radio transmitting apparatus) and a mobile station is a receiving station (radio receiving station), it is possible to implement the present invention as described above when the mobile station is a transmitting station (radio transmitting apparatus) and the base station is a receiving station (radio receiving station). For example, when a base station receives a desired signal from a mobile station of a desired signal source and receives an interference signal from a mobile station of an interference signal source simultaneously, it is possible to cancel the interference signal from the received signal and obtain the desired signal as described above. That is, the present invention is also applicable to the uplink in the same manner as the downlink.

Also, the base station, mobile station, subcarrier and guard interval may be referred to as "Node B," "UE," "tone," and "Cyclic Prefix."

Moreover, although cases have been described with the above embodiments where a communication area that one base station covers is referred to as a "cell" and an area obtained by dividing the cell into a plurality of areas in the angular direction is referred to as a "sector," there are communication systems providing a communication area that one base station covers and is referred to as a "cell site" and an area obtained by dividing the cell site into a plurality of areas in the angular direction and is referred to as a "cell." The present invention is applicable to such communication systems.

Further, although cases have been described with above embodiments where symbols are mapped on subcarrier units, it is possible to implement the present invention as described above in communication systems where a plurality of subcarriers are collectively referred to as a "sub-block" or "resource block" by performing symbol mapping in sub-block units or resource block units.

Moreover, although cases have been described with above embodiments as an example where the present invention is configured using hardware, it is also possible to implement the present invention using software.

Furthermore, each function block employed in the explanation of each of the aforementioned embodiments may typically be implemented as an LSI constituted by an integrated circuit. These may be individual chips or partially or totally contained on a single chip.

"LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field. Programmable Gate Array) or a reconfigurable processor where connections and settings of circuit cells within an LSI can be reconfigured is also possible.

Moreover, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-375402, filed on Dec. 27, 2005, the entire content of which is expressly incorporated by reference herein.

INDUSTRIAL APPLICABILITY

The present invention is preferably used in, for example, a base station and mobile station used in a mobile communication system.

The invention claimed is:

1. A radio reception apparatus that receives a transmission signal transmitted from a radio transmission apparatus with a plurality of subcarriers, the reception apparatus comprising:
   a receiving section that receives the transmission signal, which is generated by the radio transmission apparatus by mapping a plurality of first symbols on the plurality of subcarriers according to a first mapping pattern which is the same as a second mapping pattern of other radio transmission apparatuses;
   a selecting section that selects the plurality of first symbols according to the first mapping pattern; and
   an interference cancellation section that cancels an interference signal from the plurality of first symbols, wherein:
   at the radio transmission apparatus, a transmission bit is encoded to generate a first bit sequence comprising a systematic bit and a parity bit, and
   the parity bit included in the first bit sequence is repeated to generate a second bit sequence comprising a first parity bit and a second parity bit, the first parity bit corresponding to a repetition source, and the second parity bit being generated by the repetition; and
   the plurality of first symbols is generated from the first parity bit and the second parity bit by modulating the second bit sequence, the first symbols being the same as second symbols that are generated only from the first parity bit.

2. A radio communication base station apparatus comprising the radio reception apparatus according to claim 1.

3. A radio communication mobile station apparatus comprising the radio reception apparatus according to claim 1.

4. A transmission signal reception method in a radio reception apparatus that receives a transmission signal transmitted from a radio transmission apparatus with a plurality of subcarriers, the method comprising:
   receiving the transmission signal, which is generated by the radio transmission apparatus by mapping a plurality of first symbols on the plurality of subcarriers according to a first mapping pattern which is the same as a second mapping pattern of other radio transmission apparatuses;
   selecting the plurality of first symbols according to the first mapping pattern; and
   cancelling a interference signal from the plurality of first symbols, wherein:
   at the radio transmission apparatus, a transmission bit is encoded to generate a first bit sequence comprising a systematic bit and a parity bit, and
   the parity bit included in the first bit sequence is repeated to generate a second bit sequence comprising a first parity bit and a second parity bit, the first parity bit corresponding to a repetition source, and the second parity bit being generated by the repeating; and
   the plurality of first symbols is generated from the first parity bit and the second parity bit by modulating the second bit sequence, the first symbols being the same as second symbols that are generated only from the first parity bit.

* * * * *